(12) United States Patent
Nickerson et al.

(10) Patent No.: US 10,131,357 B2
(45) Date of Patent: Nov. 20, 2018

(54) VEHICLE CONTROL DURING TIP-IN

(71) Applicant: Ford Global Technologies, LLC, Dearborn, MI (US)

(72) Inventors: Kurt Howard Nickerson, Shelby Township, MI (US); Bradley Dean Riedle, Northville, MI (US); Kendrick Morrison, Wayne, MI (US); Jianping Zhang, Ann Arbor, MI (US); Cory Benson LaRoche, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 15/430,940

(22) Filed: Feb. 13, 2017

(65) Prior Publication Data

US 2018/0229728 A1 Aug. 16, 2018

(51) Int. Cl.
*B60W 10/06* (2006.01)
*B60W 30/188* (2012.01)
*B60W 10/115* (2012.01)

(52) U.S. Cl.
CPC .......... *B60W 30/188* (2013.01); *B60W 10/06* (2013.01); *B60W 10/115* (2013.01); *B60W 2510/0241* (2013.01); *B60W 2540/10* (2013.01); *B60W 2710/0666* (2013.01); *B60W 2710/105* (2013.01)

(58) Field of Classification Search
CPC ...... B60W 10/06; B60W 10/10; B60W 10/11; B60W 10/115; B60W 30/188; B60W 2710/0666
See application file for complete search history.

(56) References Cited

U.S. PATENT DOCUMENTS 8,296,026 B2   10/2012   Maeda et al.
8,306,709 B2   11/2012   Lee et al.
8,478,498 B2    7/2013   Lee et al.

FOREIGN PATENT DOCUMENTS

KR         100727200 B1 *  6/2007   ............... G11C 7/12

* cited by examiner

*Primary Examiner* — Ramya P Burgess
*Assistant Examiner* — David R Morris
(74) *Attorney, Agent, or Firm* — James Dottavio; Brooks Kushman P.C.

(57) ABSTRACT

A vehicle powertrain includes an engine and a transmission, each controlled by controllers that communicate with one another. When the vehicle is coasting in certain gears, a one-way clutch over-runs. When the driver depresses the accelerator pedal (tips in), the transmission controller adjusts a transmission torque demand limit which is communicated to the engine controller. In response, the engine controller adjusts the engine torque, resulting in a smooth re-engagement of the one-way clutch.

11 Claims, 5 Drawing Sheets

VEHICLE CONTROL DURING TIP-IN

TECHNICAL FIELD

This disclosure relates to the field of control of a powertrain for a motor vehicle. More particularly, the disclosure pertains to a method of controlling the transmission input torque during a transition from a state in which a one-way clutch is over-running to a state in which the one-way clutch carries torque.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

A vehicle powertrain includes an engine, an engine controller, a transmission gearbox, and a transmission controller. The powertrain may also include a torque converter having an impeller fixed to a crankshaft of the engine and a turbine fixed to an input of the gearbox. The engine controller commands the engine to produce a torque equal to the lesser of a driver demand torque based on a pedal position and a transmission torque limit. The transmission gearbox includes a one-way clutch with a slip speed. The transmission controller is programmed to respond to the slip speed decreasing to less than a first threshold by reducing the transmission torque limit to less than the driver demand torque. The transmission controller is further programmed to respond to the slip speed further decreasing to less than a second threshold by gradually increasing the transmission torque limit to the driver demand torque. The first and second thresholds may be functions of a turbine acceleration rate. The transmission controller may be further programmed to increase the transmission torque limit to a level substantially higher than the driver demand torque after the slip decreases to zero.

A method of controlling a transmission includes operating the transmission in a coasting gear state in which a one-way clutch overruns with a slip speed. In response to the slip speed decreasing to less than a first threshold, the transmission requests an engine torque reduction. In response to the slip speed further decreasing to less than a second threshold, the transmission increases the requested engine torque gradually back to a driver demand level based on a pedal position. The transmission may adjust the first and second thresholds based on a turbine acceleration rate.

A method of controlling a powertrain includes increasing an engine torque in response to a depression of a pedal while a one-way clutch is overrunning. In response to a slip speed of the one-way clutch subsequently decreasing to less than a first threshold, the engine torque is reduced. In response to the slip speed further decreasing to less than a second threshold, the engine torque is ramped to a level based on a position of the pedal. The first and second threshold may be functions of a turbine acceleration rate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
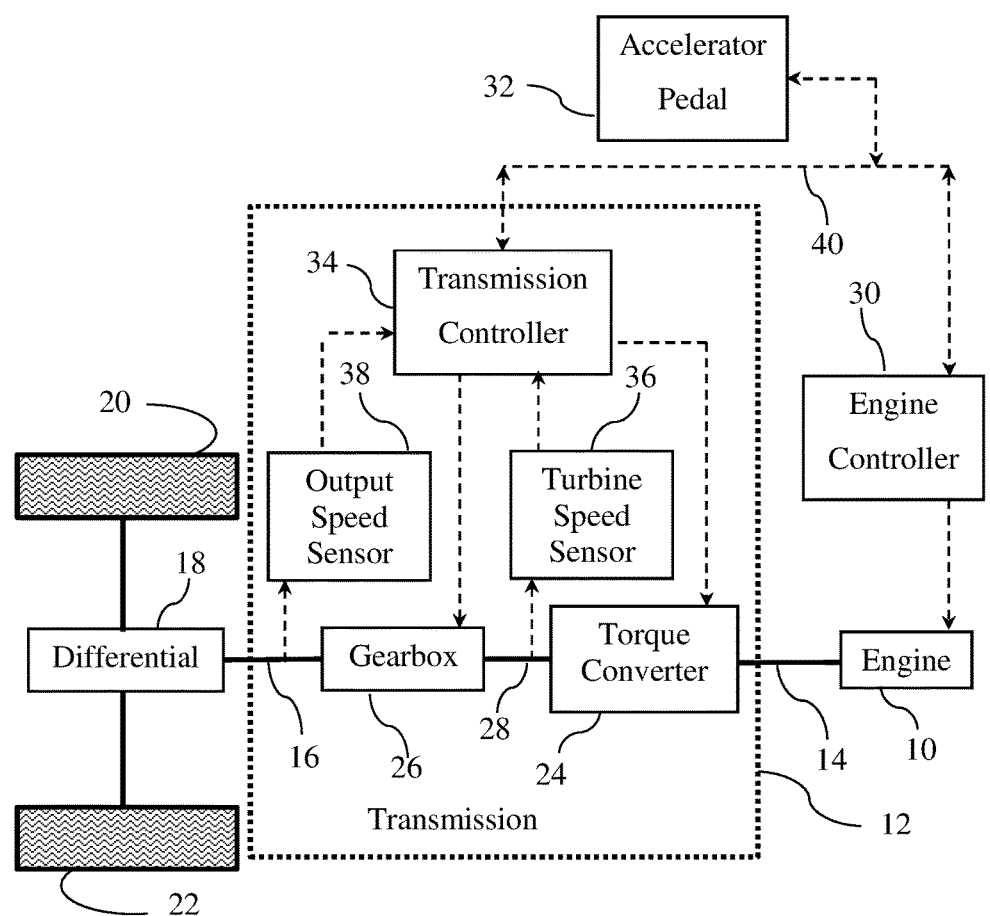
FIG. 1 is a schematic diagram of a vehicle powertrain.

FIG. 1 is a schematic diagram of a vehicle powertrain. Mechanical connections are shown with thick solid lines. Dashed lines indicate the flow of information. Power is provided by engine 10. Transmission 12 adapts the speed and torque to be suitable for vehicle operating conditions. Transmission input shaft 14 is driven by the crankshaft of engine 10. Transmission output shaft 16 drives differential 18. In a rear wheel drive configuration, transmission output shaft 16 is connected to differential 18 by a driveshaft. In affront wheel drive configuration, the differential may be housed in the same case. Differential 18 divides the power between drive wheels 20 and 22 while allowing slight speed differences such as when the vehicle turns a corner.

Within the transmission 12, power flows through a torque converter 24 and gearbox 26. The two are connected by turbine shaft 28. Torque converter 24 includes an impeller driven by the input shaft and a turbine driving the turbine shaft. When the torque converter is operating in open mode, power is transferred hydro-dynamically from the impeller to the turbine based on a speed difference between the two. The torque converter may also include a bypass clutch that selectively couples the impeller to the turbine for more efficient power transfer at higher vehicle speeds. Gearbox 26 establishes various power flow paths having different speed ratios between turbine shaft 28 and output shaft 16 by engaging various combinations of shifting clutches.

In the embodiment shown in FIG. 1, the engine and transmission utilize separate communicating controllers. In some other embodiments, a single processor may be utilized. Engine controller 30 send commands to engine 10 in order to adjust the level of torque output. The torque is based on a number of inputs including the position of accelerator pedal 32. Transmission controller 34 sends commands to torque converter 24 to control engagement of the bypass clutch and to gearbox 26 to control engagement of shifting clutches. Transmission controller 34 utilizes various sources of information including signals from turbine speed sensor 36 and output speed sensor 38. Engine controller 30, transmission controller 34, and accelerator pedal 32 may communicate with each other and with other vehicle components by posting shared data on a controller area network 40.

Figure 2:
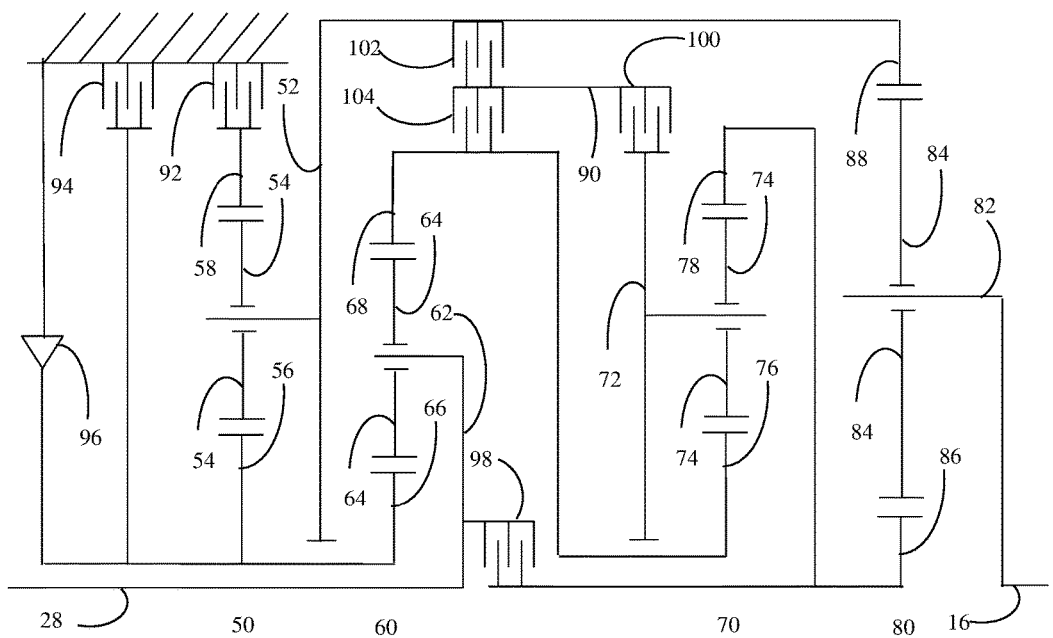
FIG. 2 is a schematic diagram of a transmission gearing arrangement.

An example gearbox 26 is schematically illustrated in FIG. 2. The gearbox utilizes four simple planetary gear sets 50, 60, 70, and 80. A planet carrier 52 rotates about a central axis and supports a set of planet gears 54 such that the planet gears rotate with respect to the planet carrier. External gear teeth on the planet gears mesh with external gear teeth on a sun gear 56 and with internal gear teeth on a ring gear 58. The sun gear and ring gear are supported to rotate about the same axis as the carrier. Gear sets 60, 70, and 80 are similarly structured.

A suggested ratio of gear teeth for each planetary gear set is listed in Table 1.

TABLE 1

| Ring 58/Sun 56 | 2.20 |
| Ring 68/Sun 66 | 1.75 |
| Ring 78/Sun 76 | 1.60 |
| Ring 88/Sun 86 | 3.70 |

In the gearbox of FIG. 2, sun gear 56 is fixedly coupled to sun gear 66, carrier 52 is fixedly coupled to ring gear 88, ring gear 68 is fixedly coupled to sun gear 76, ring gear 78 is fixedly coupled to sun gear 86, turbine shaft 28 is fixedly coupled to carrier 62, and output shaft 16 is fixedly coupled to carrier 82. Ring gear 58 is selectively held against rotation by brake 92. Sun gears 56 and 66 are selectively held against rotation by friction brake 94 and in one direction by passive one-way clutch 96. Turbine shaft 28 is selectively coupled to ring gear 78 and sun gear 86 by clutch 98. Intermediate shaft 90 is selectively coupled to carrier 72 by clutch 100, selectively coupled to carrier 52 and ring gear 88 by clutch 102, and selectively coupled to ring gear 68 and sun gear 76 by clutch 104.

As shown in Table 2, engaging the clutches and brakes in combinations of four establishes ten forward speed ratios and one reverse speed ratio between turbine shaft 28 and output shaft 16. An X indicates that the clutch is required to establish the speed ratio. An (X) indicates the clutch can be applied but is not required. In $1^{st}$ gear, either clutch 102 or clutch 104 can be applied instead of applying clutch 100 without changing the speed ratio. In $1^{st}$ and $2_{nd}$ gears, applying brake 94 enables the gearbox to transmit torque from the output shaft 16 to the turbine shaft 28 to provide engine braking. With brake 94 not engaged in these gear states, OWC 96 over-runs instead of transmitting torque back toward the turbine shaft. When the gear sets have tooth numbers as indicated in Table 1, the speed ratios have the values indicated in Table 2.

TABLE 2

|  | 92 | 94 | 96 | 98 | 100 | 102 | 104 | Ratio | Step |
|---|---|---|---|---|---|---|---|---|---|
| Rev | X | X |  |  | X | X |  | −4.79 | 102% |
| $1^{st}$ | X | (X) | X | X | (X) |  |  | 4.70 |  |
| $2^{nd}$ | X | (X) | X |  | X |  | X | 2.99 | 1.57 |
| $3^{rd}$ | X |  |  | X | X |  | X | 2.18 | 1.37 |
| $4^{th}$ | X |  |  |  | X | X | X | 1.80 | 1.21 |
| $5^{th}$ | X |  |  | X |  | X | X | 1.54 | 1.17 |
| $6^{th}$ | X |  |  | X | X | X |  | 1.29 | 1.19 |
| $7^{th}$ |  |  |  | X | X | X | X | 1.00 | 1.29 |
| $8^{th}$ |  | X |  | X | X | X |  | 0.85 | 1.17 |
| $9^{th}$ |  | X |  | X |  | X | X | 0.69 | 1.24 |
| $10^{th}$ |  | X |  |  | X | X | X | 0.64 | 1.08 |

Figure 3:
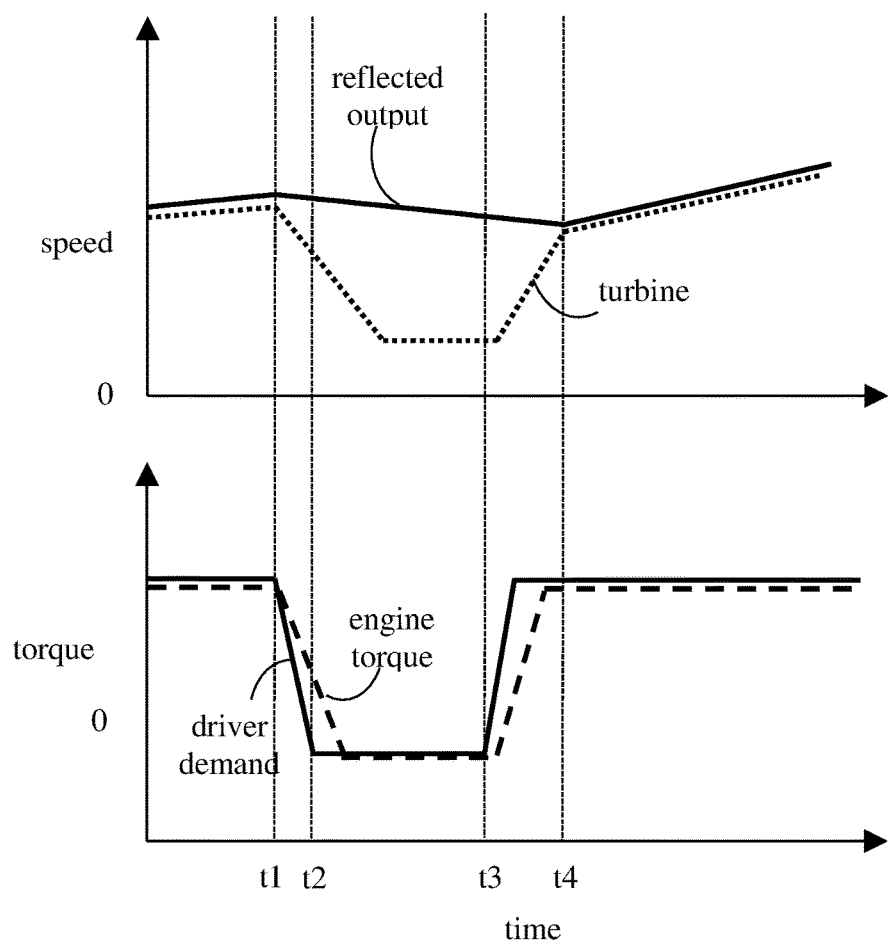
FIG. 3 is a graph illustrating a tip-in from a state in which a one-way clutch is overrunning.

FIG. 3 illustrates what may happen when the transmission is in either $1^{st}$ or $2^{nd}$ gear and the driver coasts and then presses the accelerator pedal to resume accelerating. This maneuver is called a tip-in. The bottom graph shows torque. The solid line shows the driver demanded transmission input torque. This is a calculated value that is based on the accelerator pedal position among other things. The dotted line is the actual engine torque. The top graph shows speed. The solid line shows the transmission output shaft speed divided by the gear ratio of the current gear. The dotted line shows the turbine speed. When the gear is fully engaged, these lines would coincide, but are shown slightly offset on the Figures so that they both show up.

Prior to time t1, the driver is depressing the accelerator pedal and the vehicle is accelerating. The engine controller sets the engine torque to match the driver demand. Between t1 and t2, the driver releases the accelerator pedal, causing the driver demand to decrease to zero or even a slightly negative value (engine braking). The engine torque follows the driver demand, although it may be somewhat delayed because the engine does not respond instantly. The engine and the turbine slow down as OWC 96 over-runs. During this time, the vehicle decelerates.

At time t3, the driver depresses the accelerator pedal and the driver demand torque goes to a positive level. (It is shown as going to same level as before time t1 but that is not necessarily true.) Initially, the engine torque is used to accelerate the turbine, with the vehicle continuing to decelerate. At t4, the slip across OWC 96 goes to zero and it resumes transmitting torque. The gearbox suddenly transitions from a coasting state to transmitting substantial positive torque. This sudden transition may cause a number of problems including discomfort for vehicle occupants, decreased durability of transmission components, and perhaps even damage to OWC components.

Figure 4:
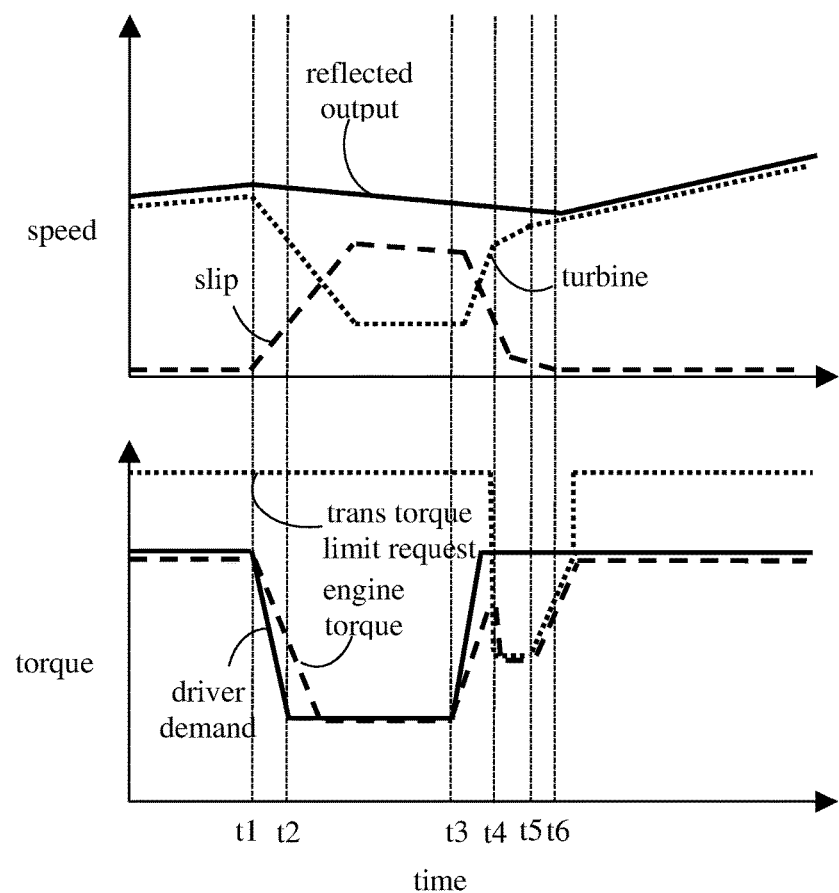
FIG. 4 is a graph illustrating a tip-in from a state in which a one-way clutch is overrunning using an improved control method.
Figure 5:
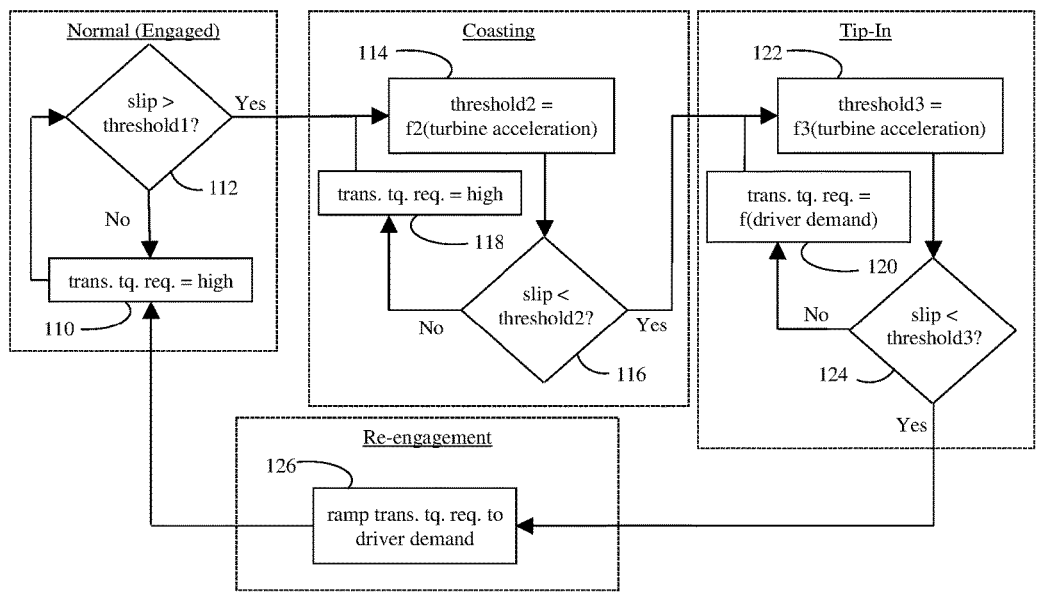
FIG. 5 is a flow chart illustrating the improved control method.

An improved engagement control is illustrated by FIGS. 4 and 5. The speed graph of FIG. 4 shows the slip which is a computed quantity equal to the difference between the output speed reflected to the turbine and the turbine speed. (Reflected to the turbine means multiplied by the transmission gear ratio.) This calculated slip value is proportional to the slip across the overrunning one-way clutch, although the constant of proportionality may vary depending upon the gear state. The torque graph of FIG. 4 shows a transmission torque limit request. This is a quantity that the transmission controller sends to the engine controller. The engine controller commands the engine to produce torque equal to the lesser of the driver demanded torque and the transmission torque limit request.

Prior to time t1, the transmission operates in a Normal mode. In this mode, at 110, transmission torque limit request is set at a high value (an arbitrary value that is higher than the maximum driver demand). Shortly after time t2, the transmission transitions into the Coasting mode. This transition is triggered by the slip exceeding a threshold at 112. The transmission torque limit request is set to the high value in coasting mode. The transmission remains in this coasting mode as long as the slip exceeds a second threshold which is a function of turbine acceleration. Generally, a higher turbine acceleration level results in a high second threshold. The second threshold is computed at 114 and compared to the slip at 116. The transmission torque limit threshold is set at 118.

At time t4, the transmission control transitions into a Tip-In mode. In the Tip-In mode, the transmission torque demand limit is set to a level calculated to gently re-engage OWC 96. The level is high enough for the turbine to continue accelerating, but low enough that the acceleration will not be excessively rapid. The level, which is calculated at 120, may be a function of the driver demand. The transmission control stays in Tip-In mode until the slip is less than a third threshold. The third threshold, which is computed at 122, may be a function of turbine acceleration. The third threshold is less than the second threshold. The slip speed is compared to the third threshold at 124. When the slip decreases to less than the third threshold at t5, the transmission control transitions to Re-engagement mode. In Re-engagement mode, at 126, the transmission torque request limit is ramped back to the driver demand over a predetermines time interval.

Under the revised control method of FIGS. 4 and 5, the one-way clutch is re-engaged under relatively low torque. This improves occupant comfort and increases reliability and durability of the one-way clutch and of other transmission components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle powertrain comprising:
   an engine;
   an engine controller programmed to command the engine to produce a torque equal to the lesser of a driver demand torque based on a pedal position and a transmission torque limit;
   a transmission gearbox having a one-way clutch with a slip speed; and
   a transmission controller in communication with the engine controller and programmed to
      respond to the slip speed decreasing to less than a first threshold by reducing the transmission torque limit to less than the driver demand torque; and
      respond to the slip speed further decreasing to less than a second threshold by gradually increasing the transmission torque limit to the driver demand torque.

2. The vehicle powertrain of claim 1 further comprising a torque converter having an impeller fixed to a crankshaft of the engine and a turbine fixed to an input of the gearbox.

3. The vehicle of claim 2 wherein the first threshold is a function of a turbine acceleration rate.

4. The vehicle powertrain of claim 3 wherein the second threshold is a function of the turbine acceleration rate.

5. The vehicle powertrain of claim 1 wherein the transmission controller is further programmed to increase the transmission torque limit to a level substantially higher than the driver demand torque after the slip decreases to zero.

6. A method of controlling a transmission comprising:
   operating the transmission in a coasting gear state in which a one-way clutch overruns with a slip speed;
   in response to the slip speed decreasing to less than a first threshold, requesting an engine torque reduction; and
   in response to the slip speed further decreasing to less than a second threshold, increasing the requested engine torque gradually back to a driver demand level based on a pedal position.

7. The method of claim 6 wherein the first threshold is a function of a turbine acceleration rate.

8. The method of claim 7 wherein the second threshold is a function of the turbine acceleration rate.

9. A method of controlling a powertrain comprising:
   while a one-way clutch is overrunning with a slip speed, increasing an engine torque in response to depression of a pedal;
   in response to the slip speed subsequently decreasing to less than a first threshold, reducing the engine torque; and
   in response to the slip speed further decreasing to less than a second threshold, ramping the engine torque to a level based on a position of the pedal.

10. The method of claim 9 wherein the first threshold is a function of a turbine acceleration rate.

11. The method of claim 10 wherein the second threshold is a function of the turbine acceleration rate.

* * * * *